United States Patent Office 3,450,807
Patented June 17, 1969

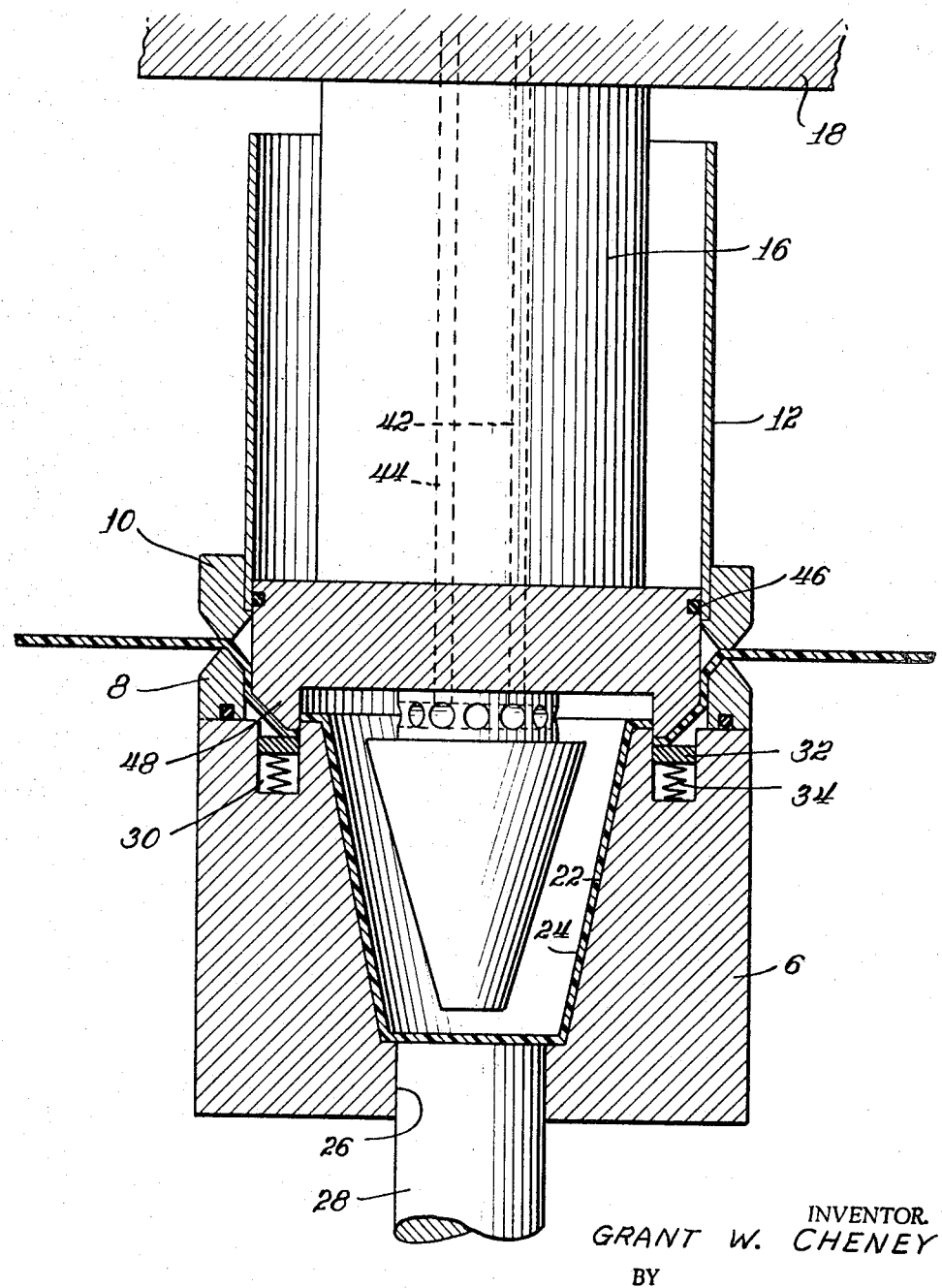

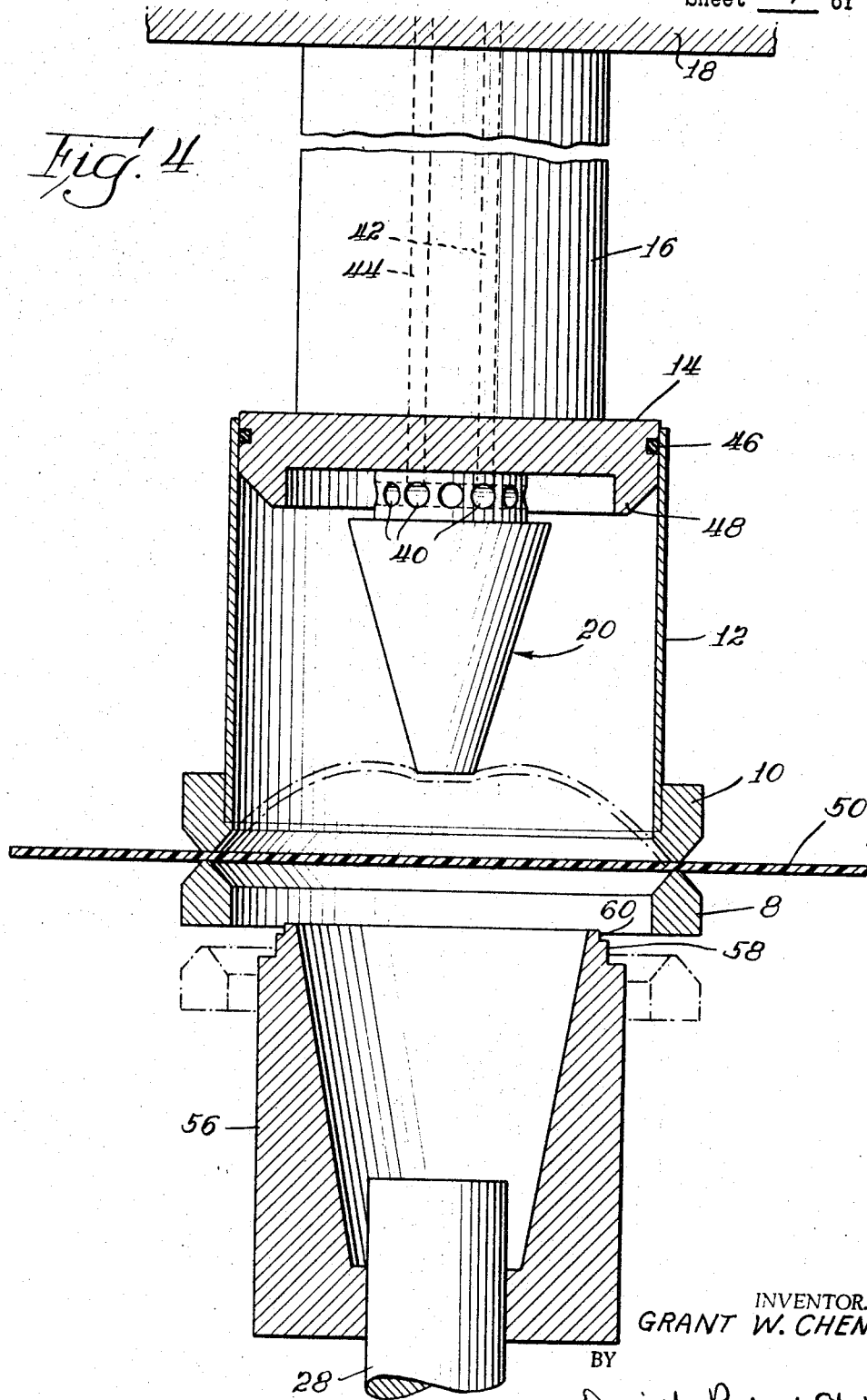

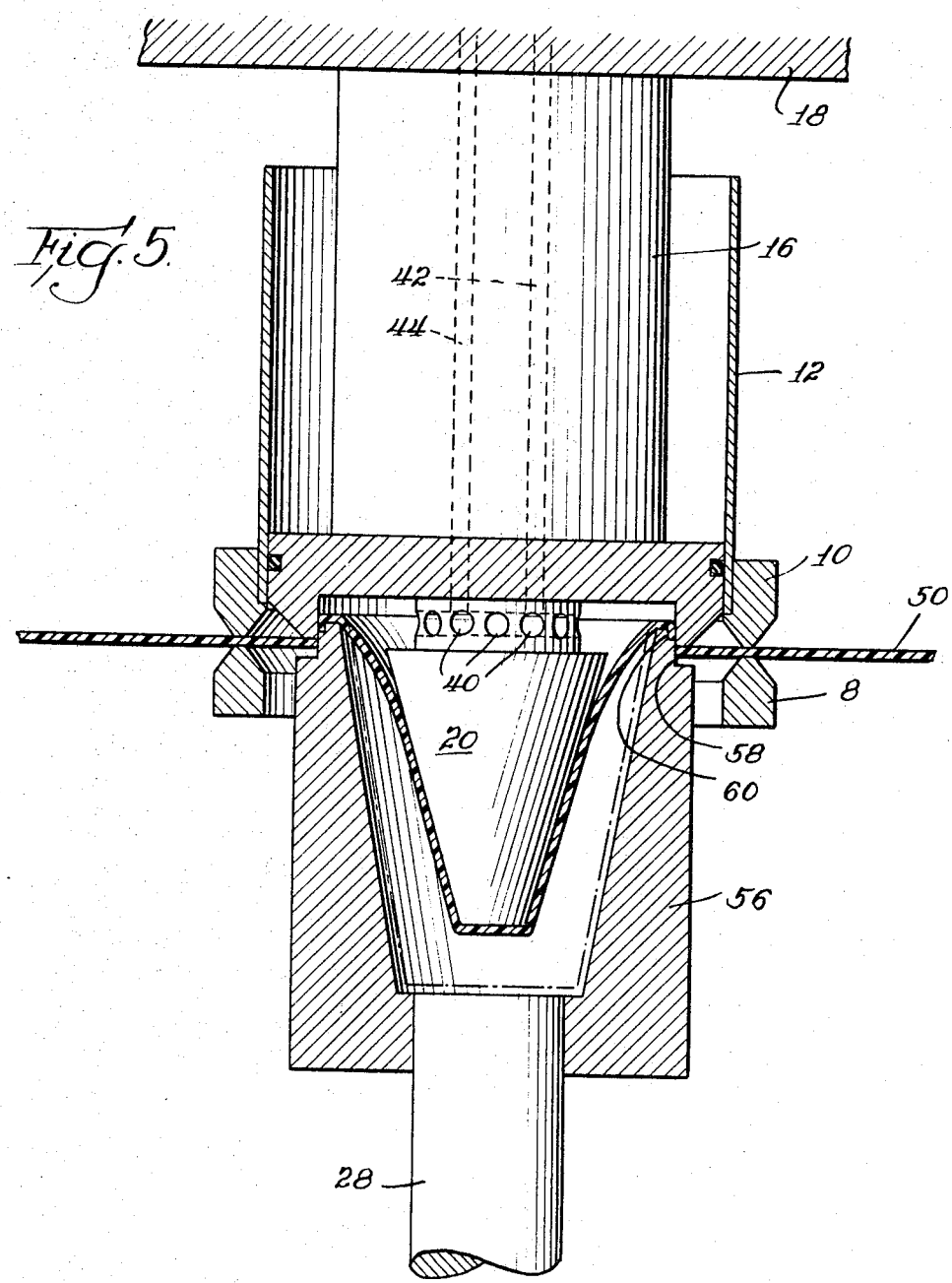

3,450,807
THERMOPLASTIC SHEET FORMATION
Grant W. Cheney, Midland, Mich., assignor to The Dow Chemical Company, Midland, Mich., a corporation of Delaware
Continuation of application Ser. No. 307,573, Sept. 9, 1963. This application June 26, 1967, Ser. No. 649,056
Int. Cl. B29c 17/04
U.S. Cl. 264—89             3 Claims

ABSTRACT OF THE DISCLOSURE

Method for forming thermoplastic sheet into containers including a housing with a forming plug therein and a sheet clamping means on the lower end of the housing. The sheet is clamped, then billowed into the housing into contact with the forming plug. Then the plug descends into an open-end container mold and the sheet blown to conform to the walls of the mold to form a container. The sheet may be severed after clamping.

This application is a continuation of application Ser. No. 307,573, filed Sept. 9, 1963, now abandoned.

This invention relates to a method for the formation of thermoplastic sheet into containers, more particularly, cup-like containers.

It is, of course, known to form a cup-like container from a thermoplastic material by mechanically forcing the material into a die cavity by use of a mandrel, following which the material is expanded by pressure fluid into contact with the walls of the cavity. The cup-like container so formed, is trimmed about its lip portion either prior to or after removal from the die cavity.

While some of such known methods have produced satisfactory containers most require a high degree of adjustment and production under carefully controlled conditions. One problem encountered is the obtainment of uniform wall thickness in the container. An underlying cause which contributes to such problem, is the fact that once any portion of the material engages the mandrel and/or the walls of the die cavity, it has a tendency to stick thereto, which action prevents further stretching of the material so engaged. Consequently, the material which is last engaged by the mandrel or die cavity, is stretched more than the material which has prior engagement therewith. As a result, a cup of non-uniform wall thickness is produced which has poor strength characteristics, as well as an unattractive appearance.

The method of the present invention will be found to produce thermoplastic cups of uniform wall thickness. Briefly, the inventive concept relies upon a preliminary stretching of the sheet material before and after it is engaged by an end portion of the forming mandrel. Such stretching is accomplished by exposing the material to a pressure differential in such a manner that it is billowed in the direction of the forming mandrel. Upon contact with the end of the mandrel, the material continues to be billowed about the mandrel without contact with the side wall of the mandrel. As the mandrel is lowered into the mold cavity, the prestretched material moves into contact with the side wall thereof, and is subsequently moved therefrom (with final stretching) into contact with the wall of the mold cavity by means of a pressure differential acting in a sense opposite to that of the first applied pressure differential. The method of the invention will be seen to produce cups having uniform wall thickness and an attractive appearance.

The main object of this invention is to provide an improved method for the production of containers made from thermoplastic sheet material.

A more specific object of the invention is to provide a method which will produce thermoplastic cup-like containers of improved strength and attractive appearance.

A specific object is to provide a method for production of uniform thickness cup-like containers from sheet material.

These and further objects and features of the invention will become more apparent from the following description and accompanying drawings wherein:

FIG. 3 is the same but showing a final phase of operation;

FIG. 4 is a sectional elevation view of a second embodiment of the invention and showing the relative position of various parts at an initial phase of operation; and FIG. 5 is the same but showing a final phase of operation.

Figure 1:
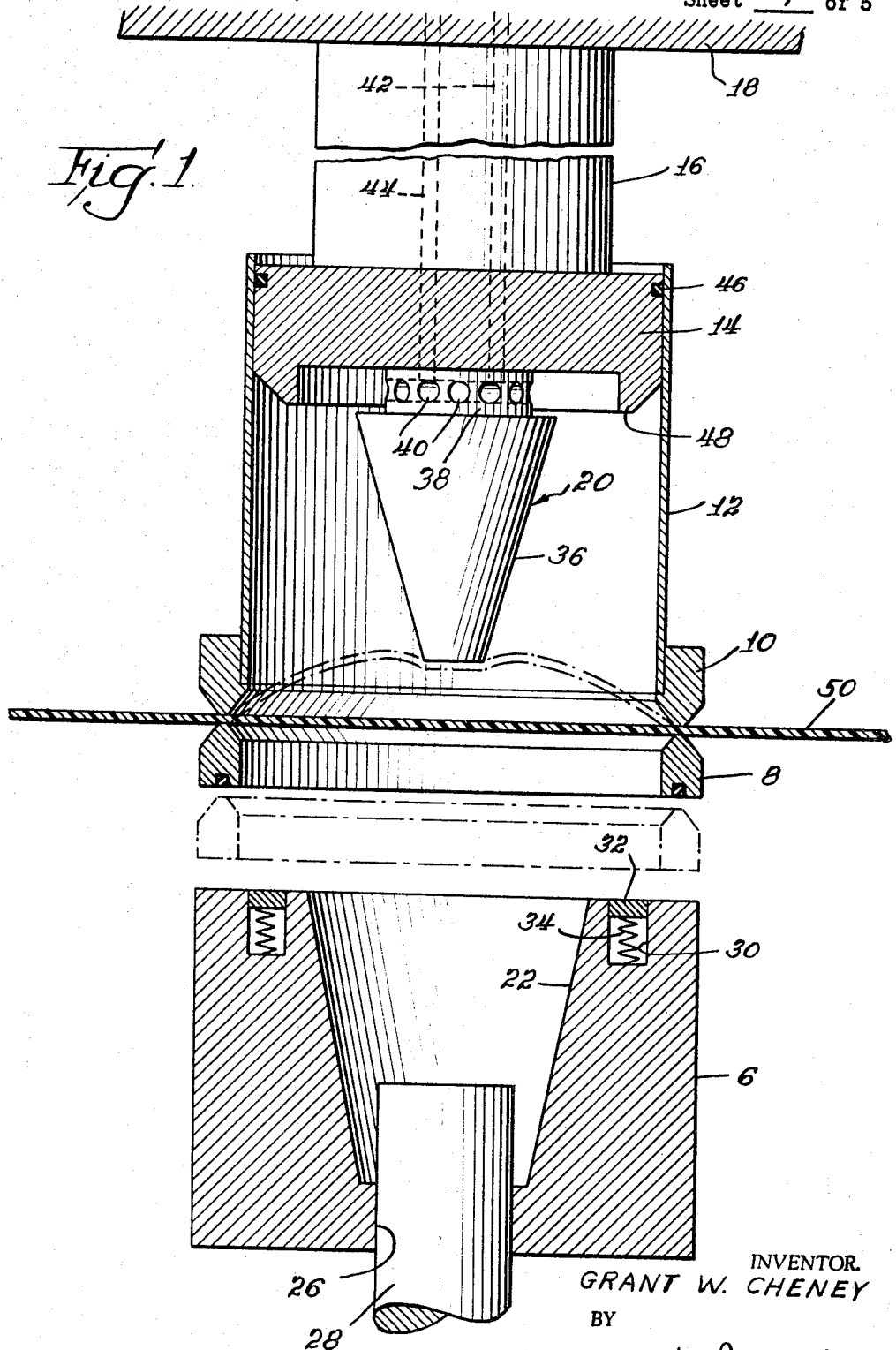
FIG. 1 is a sectional elevation view of apparatus embodying the principles of the invention, and illustrating the relative position of various parts at an initial phase of operation.

Referring now to the drawings and more particularly FIG. 1, a mold assembly is shown which includes a mold 6, a clamp frame including a lower clamp ring 8 and an upper clamp ring 10, a cylindrical shell, or housing 12 attached to the upper clamp ring, a trim die 14 secured to a plunger, or ram 16 which is attached to a movable platen 18, and a mandrel in the shape of forming plug assembly 20 arranged below the trim die.

The mold 6, which is formed with a cavity 22 in the shape of the item to be formed therein, in this case a round symmetrically shaped cup 24 (FIG. 3), has an opening 26 at the lower portion for slidingly receiving a reciprocable ejector pin 28. The upper portion of the mold has a circumferential groove 30 in which a pressure ring 32 is slidably supported upon a plurality of resilient means, such as helical springs 34.

The forming plug assembly 20 includes a mandrel, or plug 36 which is of similar shape, but smaller dimension than the mold cavity 22, and a manifold block 38 interposed between the plug 36 with the trim die 14. The manifold block 38 has a plurality of passageways with openings 40, some of said passageways being connected to an air pressure passageway 42, while the other of said passageways are connected to a vacuum passageway 44. The passageways 42 and 44 selectively connect the interior of the housing 12 with a source of air pressure or vacuum respectively, as required in a cup forming operation, as explained hereinafter.

Means (not shown) are provided for maintaining the upper clamp ring 10 and attached housing 12 in fixed position, while additional means (not shown) are provided for reciprocably moving the lower clamp ring 8 relative to the upper clamp ring. Means (not shown) are also provided for moving the mold 6 toward and away from the lower clamping ring 8.

The trim die 14 is adapted for sliding movement within the housing 12 and a tight seal is maintained therebetween by virtue of a ring gasket 46. The trim die 14 has a circumferentially disposed cutter rib 48 the lower end of which slidingly fits within the mold groove 30, during a cutting operation, as best seen in FIG. 3.

The operation of the mold assembly above described is as follows. A heated sheet 50 of uniform thickness thermoplstic material, is clamped in air-tight manner, between the lower and upper clamp rings 8 and 10 respectively, and the interior of the housing 12 is exposed to predetermined sub-atmospheric, or vacuum pressure operating through certain of the openings 40 and the passageway 44. As a result of the pressure differential to which the sheet 50 is exposed, the sheet will billow or flex inwardly of the housing 12, a certain portion of the sheet engaging the lower extremity of the plug 36, all as illustrated in dashed lines in FIG. 1. Such action will give the sheet 50 a preliminary stretching, which will not only give the material some degree of orientation which contributes to the strength of the cup so formed, but will also provide more uniform final stretching in subsequent phases of the forming operation.

Figure 2:
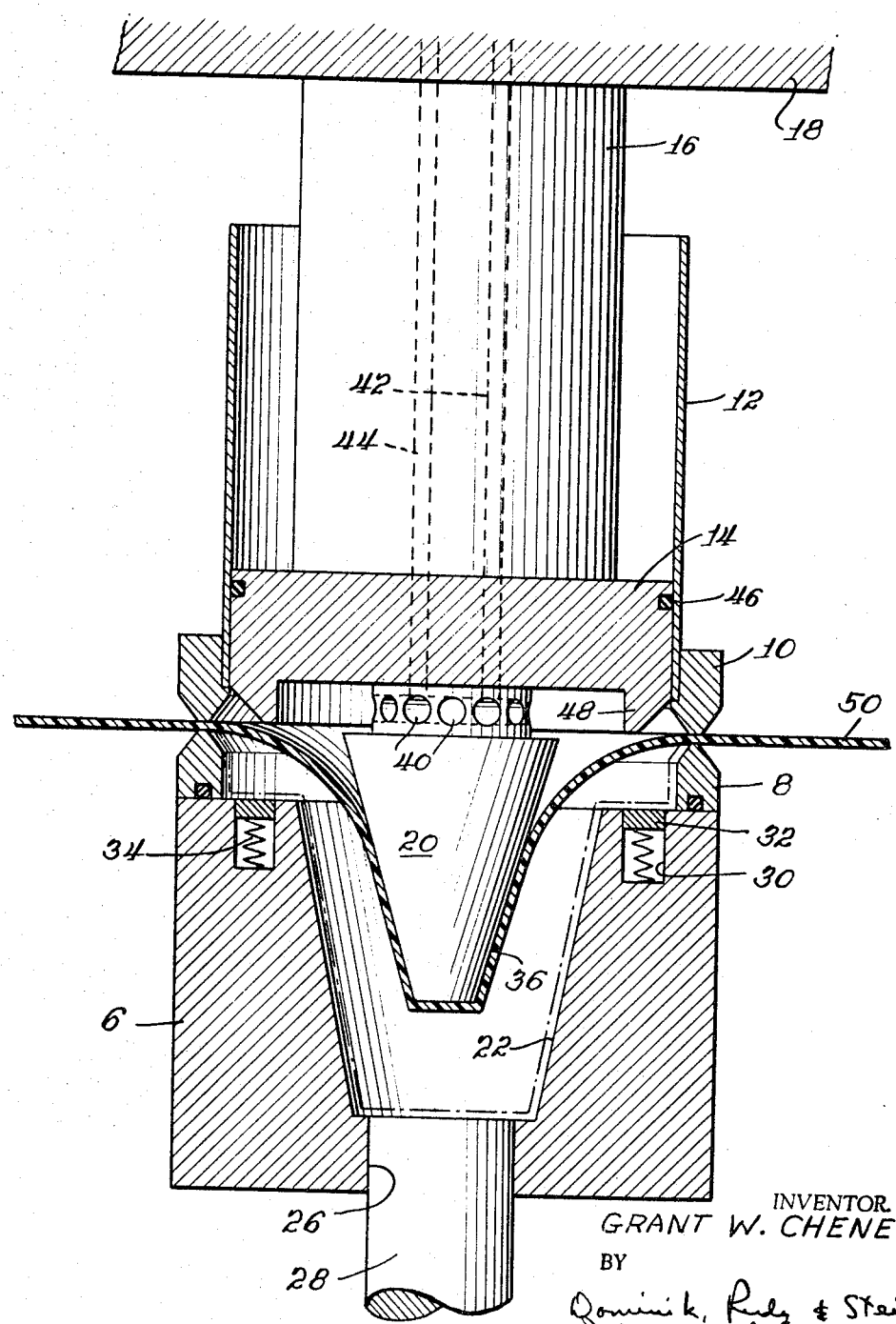
FIG. 2 is the same but showing an intermediate phase of operation.

Referring now to FIG. 2, the plug assembly 20 and trim die 14 is moved downwardly and at the same time, the mold 6 is moved upwardly. During said parts movement, the pressure differential on the billowed thermoplastic material is regulated as necessary to provide cling of the material to the plug 36. It will be appreciated that prestretching of the material will cause the material to have substantially uniform thickness distribution as it is engaged by the plug. Such a provision will counteract any tendency of the plug to distort material thickness upon engagement therewith, as generaly occurs with material which has not been prestretched.

Further relative movement of the plug assembly and mold will be accompanied by an induced change of pressure within the cup being formed, from sub-atmospheric or vacuum, to positive pressure suficient to cause movement of the material from engagement with the plug and into engagement with the mold cavity 22 as seen in FIG. 3. It may be mentioned that during such movement of the material into engagement with the walls of the mold cavity, air pressure between the cup and cavity can escape through the clearance between the mold opening 26 and the ejector pin 28. If such clearance is not sufficient to provide desired results, air relief passageways (not shown) may be provided in the mold 6 as required.

During the last phase of cup formation, the material at the upper end of the cup 24 will be forced by air pressure into sealing engagement with the flat peripheral edge adjacent the mold cavity 22 following which the cutter rib 48 will sever the cup from the sheet of material 50, as the rib 48 moves into the groove 30 (FIG. 3). Once the material has been placed in contact with the walls of the die cavity, it will rapidly set up because of the high rate of heat transfer from the material to the mold walls.

The mold 6 is then lowered and the plug assembly 20 is raised, with said relative movement being of a sufficient amount to allow the pin 28 to eject the formed cup 24 from the mold cavity. The parts are then positioned as shown in FIG. 1 in readiness for another cup forming operation, as above described.

It will be understood that the cup forming operation can be arranged to take place in a rapid manner and limited only by physical characteristics of the thermoplastic and the kinematics of the moving parts, may be programmed for automatic production. Furthermore, while only one molding apparatus has been shown, it will be appreciated that more than one molding station may be arranged for simultaneous operation so that productive capacity can be greatly increased.

A modified type of molding apparatus embodying the principles of the invention, is shown in FIGS. 4 and 5. The second embodiment of the invention differs in certain details of mold construction, and similar parts in common with the first described embodiment, will be identified by the same numerals.

Referring now to FIG. 4, it will be seen that a mold 56 has a top peripheral portion defined by two concentrically arranged edge portions 58 and 60. The edge portion 58 has a diameter which provides a sliding fit with the inner diameter of the cutter rib 48. The inner diameter of the edge portion 60 is such as to provide an annular spacing, defined in part by the inner diameter of the cutter rib 48, of dimension equal to the thickness of a downwardly extending lip portion 62 (FIG. 5) of a cup formed in the molding apparatus. The upper surface of the edge portion 60 is arranged in a plane lying above the upper surface of the edge portion 58.

It will be seen that a cup formed in the apparatus of the second embodiment will be substantially identical with that formed in the apparatus of the first described embodiment, except that the lip portion of the cup will have a downwardly extending portion 62. The cup portion 62 will be formed by downward movement of the die cutter rib after the sheet material is severed thereby. The operation of the apparatus of the second embodiment will be similar in all other respects to that of the first described embodiment.

From the foregoing, it will be evident that both embodiments of the invention will satisfy the objectives set forth hereinbefore.

What is claimed is:

1. A method for forming thermoplastic sheet material into a container comprising the steps of first clamping the material in an air-tight manner about the open end of a housing containing a forming plug spaced from said sheet material, said plug forming an air-tight seal with said housing, and said plug being in alined, spaced relation with an open end mold cavity in a mold, applying a predetermined amount of vacuum within said housing to cause said material to billow and engage the lower extremity of said forming plug to give the sheet a preliminary stretch, moving the mold into sealing engagement with the housing, then moving the forming plug into said mold cavity to induce a positive pressure between said plug and said sheet material clamped about said housing in said housing to force said material into engagement with the walls of said mold cavity.

2. The method of claim 1 further including the step of regulating the vacuum applied within said housing to provide cling of said material only to the lower extremity of said forming plug while moving the mold into sealing enagement with the housing.

3. The method of claim 1 further including the step of peripherally severing said material in the region of the open end of said mold cavity.

References Cited

UNITED STATES PATENTS 3,060,507 10/1962 Knowles _____ 264—89
3,291,874 12/1966 Negoro _____ 264—89

OTHER REFERENCES

Plastics Engineering Handbook, 3 ed. N.Y., Reinhold, 1960, pp. 103–107, TP986A2.

ROBERT F. WHITE, *Primary Examiner.*

T. J. CARVIS, *Primary Examiner.*

U.S. Cl. X.R.

18—19; 264—94